US012347974B2

(12) United States Patent
Huang et al.

(10) Patent No.: US 12,347,974 B2
(45) Date of Patent: Jul. 1, 2025

(54) ELECTRIC CONNECTOR AND ELECTRIC CONNECTOR ASSEMBLY WITH SIMPLIFIED GROUNDING METHOD AND IMPROVED STABILITY OF SIGNAL TRANSMISSION

(71) Applicant: DONGGUAN LUXSHARE TECHNOLOGIES CO., LTD, Dongguan (CN)

(72) Inventors: Bin Huang, Dongguan (CN); Rongzhe Guo, Dongguan (CN); Kunlin Yao, Dongguan (CN); Qiongnan Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 337 days.

(21) Appl. No.: 17/890,051

(22) Filed: Aug. 17, 2022

(65) Prior Publication Data

US 2023/0063499 A1 Mar. 2, 2023

(30) Foreign Application Priority Data

Aug. 31, 2021 (CN) ........................ 202122085190.X

(51) Int. Cl.
*H01R 13/6471* (2011.01)
*H01R 12/58* (2011.01)
(Continued)

(52) U.S. Cl.
CPC ....... *H01R 13/6471* (2013.01); *H01R 12/585* (2013.01); *H01R 12/712* (2013.01);
(Continued)

(58) Field of Classification Search
CPC .......................... H01R 13/6471; H01R 12/585; H01R 12/712; H01R 12/79; H01R 13/516;
(Continued)

(56) References Cited

U.S. PATENT DOCUMENTS 9,634,409 B2 * 4/2017 Tsai .................. H01R 43/0256
2021/0257785 A1 * 8/2021 Shah .................... H01R 12/724
2023/0369800 A1 * 11/2023 Wolfe ................ H01R 13/6471

FOREIGN PATENT DOCUMENTS

CN 208955248 U 6/2019

* cited by examiner

*Primary Examiner* — Justin M Kratt
(74) *Attorney, Agent, or Firm* — Birch, Stewart, Kolasch & Birch, LLP

(57) ABSTRACT

An electrical connector includes an insulating body, a number of first conductive terminals, a number of second conductive terminals, and a number of cables. The first conductive terminals include a number of first signal terminals and a number of first ground terminals. The second conductive terminals include a number of second signal terminals and a number of second ground terminals. The cables include a number of first cables electrically connected with the first signal terminals and a number of second cables electrically connected with the second signal terminals. The first ground terminals and the second ground terminals are connected to each other and are adapted to be electrically connected to a circuit board. With this arrangement, the present disclosure avoids ground return through cables, thereby simplifying the grounding method and improving the stability of signal transmission. The present disclosure also discloses an electrical connector assembly having the electrical connector.

14 Claims, 22 Drawing Sheets

(51) Int. Cl.

| | |
|---|---|
| ***H01R 12/71*** | (2011.01) |
| ***H01R 12/79*** | (2011.01) |
| ***H01R 13/516*** | (2006.01) |
| ***H01R 13/6594*** | (2011.01) |
| ***H01R 13/6597*** | (2011.01) |
| *H01R 4/02* | (2006.01) |
| *H01R 12/50* | (2011.01) |
| *H01R 12/51* | (2011.01) |
| *H01R 12/72* | (2011.01) |
| *H01R 13/646* | (2011.01) |
| *H01R 13/6461* | (2011.01) |
| *H01R 13/6591* | (2011.01) |

(52) U.S. Cl.

CPC ........... *H01R 12/79* (2013.01); *H01R 13/516* (2013.01); *H01R 13/6594* (2013.01); *H01R 13/6597* (2013.01); *H01R 4/02* (2013.01); *H01R 4/021* (2013.01); *H01R 4/023* (2013.01); *H01R 12/50* (2013.01); *H01R 12/51* (2013.01); *H01R 12/58* (2013.01); *H01R 12/71* (2013.01); *H01R 12/714* (2013.01); *H01R 12/716* (2013.01); *H01R 12/727* (2013.01); *H01R 13/646* (2013.01); *H01R 13/6461* (2013.01); *H01R 13/6591* (2013.01)

(58) Field of Classification Search

CPC .. H01R 13/6594; H01R 13/6597; H01R 4/02; H01R 4/021; H01R 4/023; H01R 12/50; H01R 12/51; H01R 12/58; H01R 12/71; H01R 12/714; H01R 12/716; H01R 12/727; H01R 13/646; H01R 13/6461; H01R 13/6591

See application file for complete search history.

ELECTRIC CONNECTOR AND ELECTRIC CONNECTOR ASSEMBLY WITH SIMPLIFIED GROUNDING METHOD AND IMPROVED STABILITY OF SIGNAL TRANSMISSION

CROSS-REFERENCE TO RELATED APPLICATION

This patent application claims priority of a Chinese Patent Application No. 202122085190.X, filed on Aug. 31, 2021 and titled "ELECTRIC CONNECTOR AND ELECTRIC CONNECTOR ASSEMBLY", the entire content of which is incorporated herein by reference.

TECHNICAL FIELD

The present disclosure relates to an electrical connector and an electrical connector assembly, which belongs to a technical field of electrical connectors.

BACKGROUND

An electrical connector usually includes an insulating body and a plurality of conductive terminals fixed to the insulating body. The conductive terminal includes a mating portion for contacting with a mating connector. The plurality of conductive terminals include high-speed signal terminals, ground terminals and other terminals. The high-speed signal terminals and the ground terminals are adapted for connecting with cables, and the other terminals are adapted for being mounted to a circuit board.

With this design, the ground terminals need to be grounded back through the cables or used as a reference, and the length of the cable will be relatively long, which affects the stability of signal transmission.

SUMMARY

An object of the present disclosure is to provide an electrical connector and electrical connector assembly which have a simple grounding method and are beneficial to improve the stability of signal transmission.

In order to achieve the above object, the present disclosure adopts the following technical solution: an electrical connector adapted to be at least partially mounted to a circuit board, the electrical connector including: an insulating body, the insulating body defining a mating slot; a plurality of first conductive terminals, the plurality of first conductive terminals including a plurality of first signal terminals and a plurality of first ground terminals, each of the first conductive terminals including a first mating portion extending into the mating slot, the first mating portions of the plurality of first conductive terminals being arranged in a first row; a plurality of second conductive terminals, the plurality of second conductive terminals including a plurality of second signal terminals and a plurality of second ground terminals, each of the second conductive terminals including a second mating portion extending into the mating slot, the second mating portions of the plurality of second conductive terminals being arranged in a second row; and a plurality of cables, the plurality of cables including a plurality of first cables electrically connected with the plurality of first signal terminals and a plurality of second cables electrically connected with the plurality of second signal terminals; wherein the plurality of first ground terminals and the plurality of second ground terminals are connected to each other and are adapted to be electrically connected to the circuit board.

In order to achieve the above object, the present disclosure adopts the following technical solution: an electrical connector assembly, including: a first electrical connector; a second electrical connector; and a circuit board, the circuit board including a first side and a second side opposite to the first side; wherein the first electrical connector is mounted to the first side of the circuit board, and the second electrical connector is mounted to the second side of the circuit board; wherein the first electrical connector includes: an insulating body, the insulating body defining a mating slot; a plurality of first conductive terminals, the plurality of first conductive terminals including a plurality of first signal terminals and a plurality of first ground terminals, each of the first conductive terminals including a first mating portion extending into the mating slot, the first mating portions of the plurality of first conductive terminals being arranged in a first row; a plurality of second conductive terminals, the plurality of second conductive terminals including a plurality of second signal terminals and a plurality of second ground terminals, each of the second conductive terminals including a second mating portion extending into the mating slot, the second mating portions of the plurality of second conductive terminals being arranged in a second row; and a plurality of cables, the plurality of cables including a plurality of first cables electrically connected with the plurality of first signal terminals and a plurality of second cables electrically connected with the plurality of second signal terminals; wherein the plurality of first ground terminals and the plurality of second ground terminals are connected to each other and are electrically connected to the circuit board.

Compared with the prior art, the present disclosure avoids the use of cables for ground return by connecting the plurality of first ground terminals and the plurality of second ground terminals to each other and to the circuit board. On one hand, it simplifies the grounding method; on the other hand, it is beneficial to improve the stability of signal transmission.

DETAILED DESCRIPTION

Figure 1:
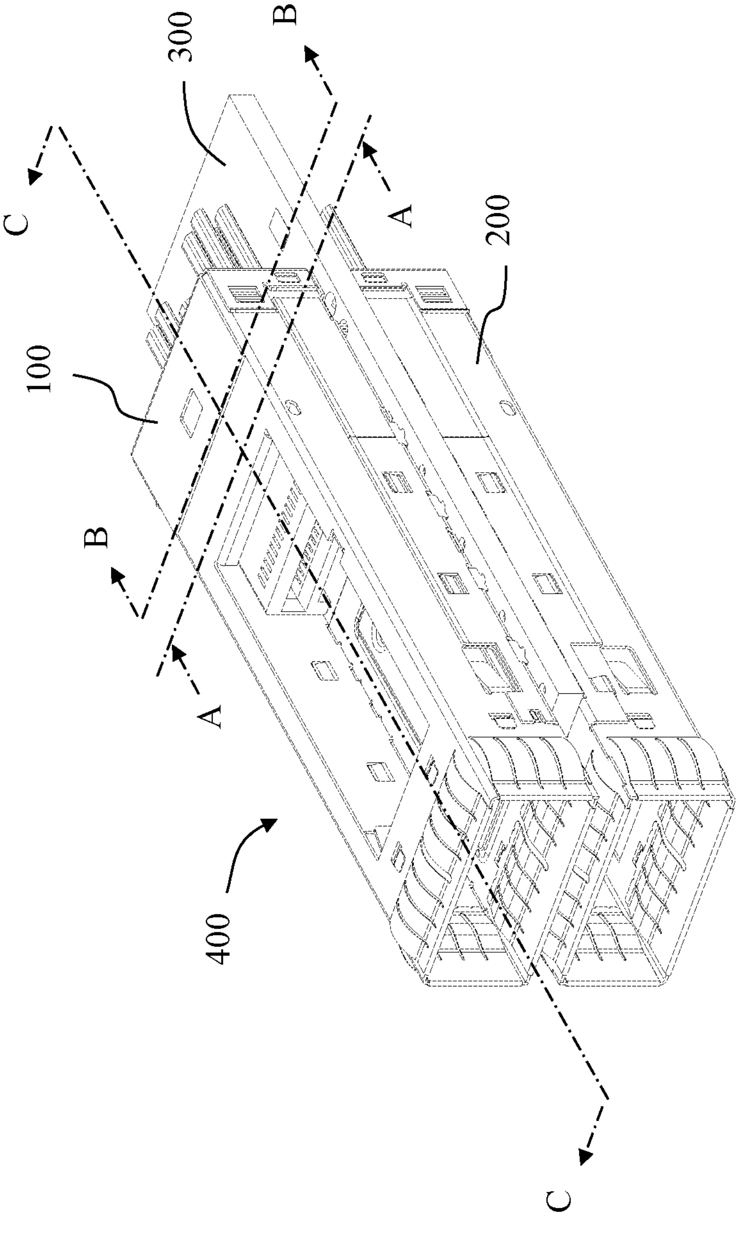
FIG. 1 is a perspective schematic view of an electrical connector assembly in accordance with an embodiment of the present disclosure.
Figure 2:
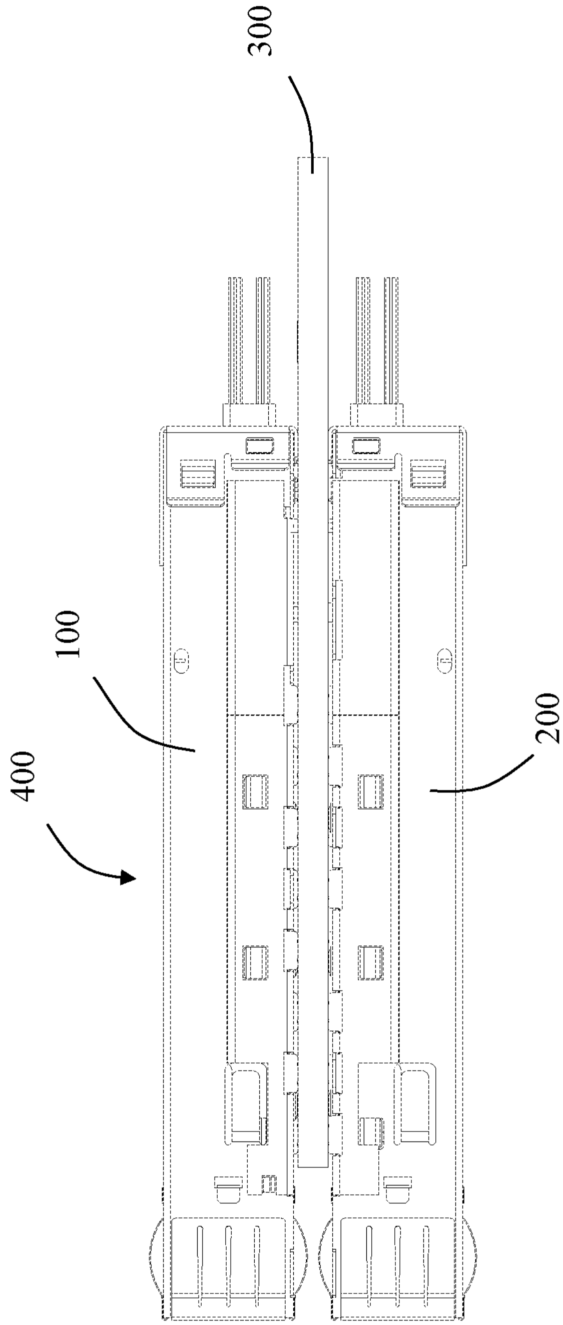
FIG. 2 is a right side view of FIG. 1.
Figure 3:
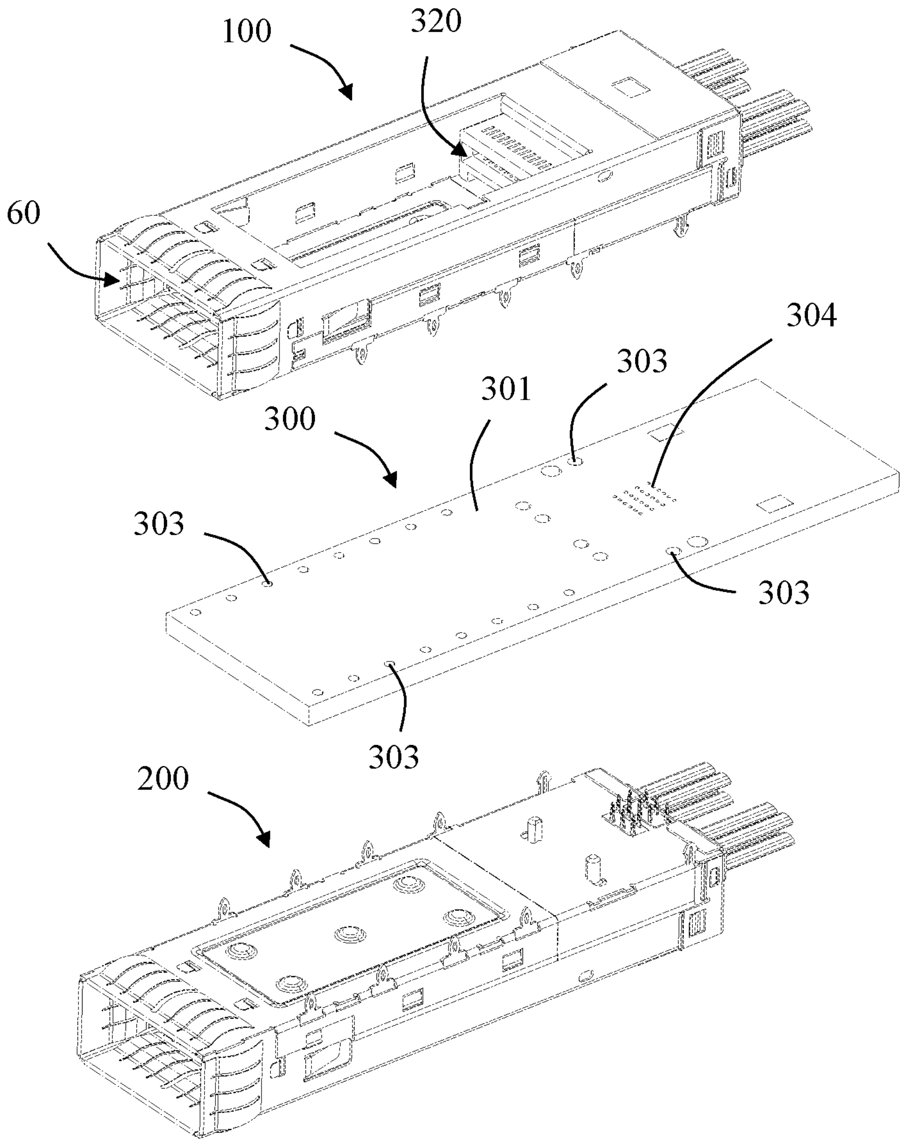
FIG. 3 is a partially exploded perspective view of FIG. 1.
Figure 4:
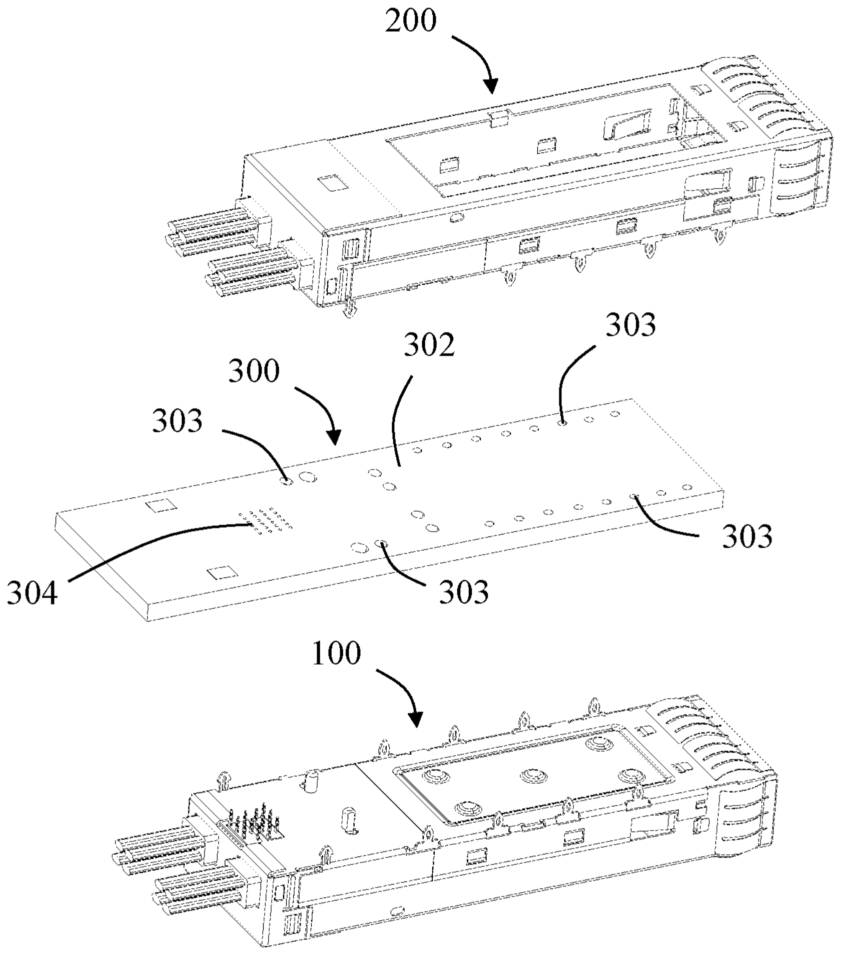
FIG. 4 is a partially exploded perspective view of FIG. 3 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 4, the present disclosure discloses an electrical connector assembly 400 including a circuit board 300, a first electrical connector 100, and a second electrical connector 200. The circuit board 300 includes a first side 301 (for example, an upper surface) and a second side 302 (for example, a lower surface) opposite to the first side 301. The circuit board 300 also defines a plurality of locking holes 303 extending through the first side 301 and the second side 302, and a plurality of conductive holes 304 extending through the first side 301 and the second side 302. In the illustrated embodiment of the present disclosure, the first electrical connector 100 is mounted to the first side 301 of the circuit board 300. The second electrical connector 200 is mounted to the second side 302 of the circuit board 300. This arrangement is beneficial to improve the utilization rate of the circuit board 300. Of course, in other embodiments, the electrical connector assembly 400 may also include the circuit board 300 and one connector (for example, the first electrical connector 100).

Referring to FIGS. 5 to 11, the first electrical connector 100 and/or the second electrical connector 200 are high-speed connectors, such as QSFP connectors, SFP connectors, OSFP connectors, or OSFP-DD connectors, etc. Of course, in other embodiments, the first electrical connector 100 and/or the second electrical connector 200 may also be other types of connectors. A general concept of the first electrical connector 100 and the second electrical connector 200 is an electrical connector. In the illustrated embodiment of the present disclosure, the first electrical connector 100 and the second electrical connector 200 have the same structure, therefore the following only takes the first electrical connector 100 as an example for detail portioned description.

The first electrical connector 100 includes an insulating body 3, a first conductive terminal module 1 mounted to the insulating body 3, a second conductive terminal module 2 mounted to the insulating body 3, a fixing piece 4 fixed on the first conductive terminal module 1 and the second conductive terminal module 2, an over-molding housing 5 at least partially over-molded on the insulating body 3, and a metal cage 6 enclosing the insulating body 3 and the over-molding housing 5.

The insulating body 3 includes a base 31 and a protruding portion 32 extending forwardly from the base 31. The insulating body 3 includes a mounting wall 331 at the bottom. The mounting wall 331 includes a mounting surface 3311 for being mounted to the circuit board 300 and a plurality of positioning posts 3312 protruding beyond the mounting surface 3311 for being mounted to the circuit board 300. The mounting wall 331 further includes a mounting groove 3313 and a plurality of positioning protrusions 3314 protruding into the mounting groove 3313. The protruding portion 32 includes a mating surface 321 and a mating slot 320 extending through the mating surface 321. The base 31 includes a rear end surface 311 opposite to the mating surface 321 and a receiving space 310 extending through the rear end surface 311. The receiving space 310 is in communication with the mating slot 320 and is adapted for receiving the first conductive terminal module 1 and the second conductive terminal module 2.

The first conductive terminal module 1 includes a first insulating block 11, a plurality of first conductive terminals 12 fixed to the first insulating block 11, a plurality of first cables 13, a first fixing block 14 for fixing at least parts of the first conductive terminals 12, and a first ground piece 15.

The first insulating block 11 includes a first slot 111 and a first mating surface 112. In an embodiment of the present disclosure, the plurality of first conductive terminals 12 are insert-molded in the first insulating block 11. Parts of the plurality of first conductive terminals 12 are exposed in the first slot 111. Referring to FIGS. 12 to 23, the plurality of first conductive terminals 12 include a plurality of first signal terminals S1, a plurality of first ground terminals G1, and a plurality of first intermediate terminals M1. In an embodiment of the present disclosure, the plurality of first signal terminals S1 include a plurality of first signal terminal groups. Each first signal terminal group includes two of the first signal terminals S1. Each first signal terminal group is located between two first ground terminals G1. The first signal terminals S1 and the first cables 13 are fixed by soldering or welding.

Figure 13:
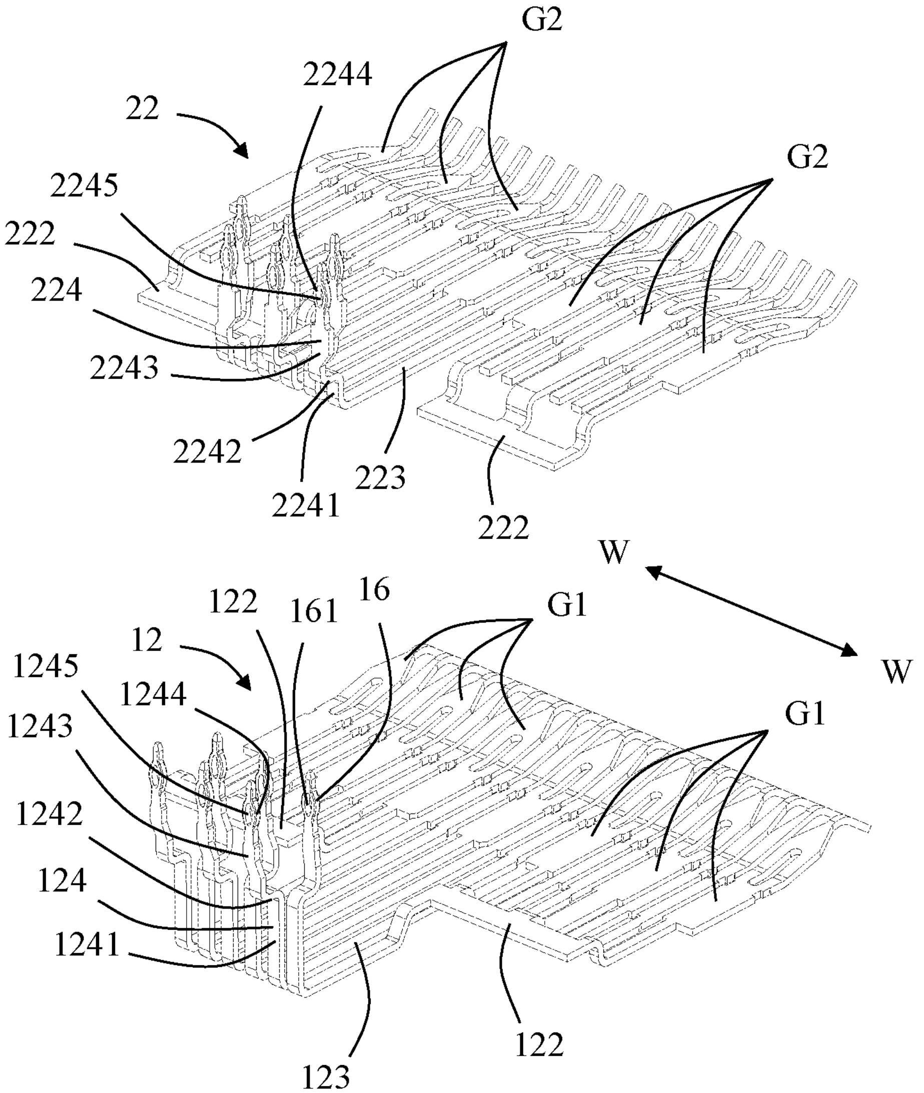
FIG. 13 is a perspective schematic view of FIG. 12 from another angle.
Figure 14:
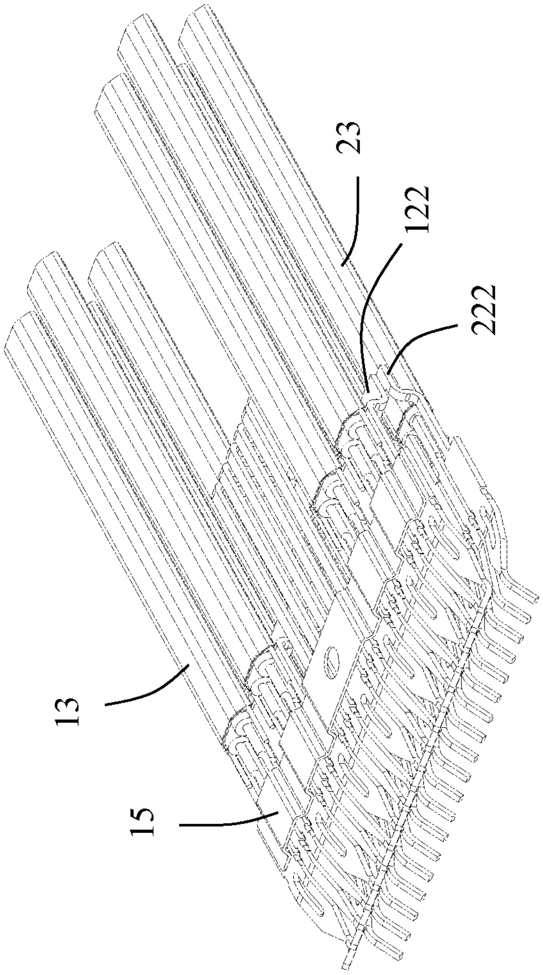
FIG. 14 is a perspective schematic view of a mutual positional relationship of the first conductive terminals, a first ground piece, first cables, the second conductive terminals, a second ground piece, and second cables when they are assembled in position.
Figure 15:
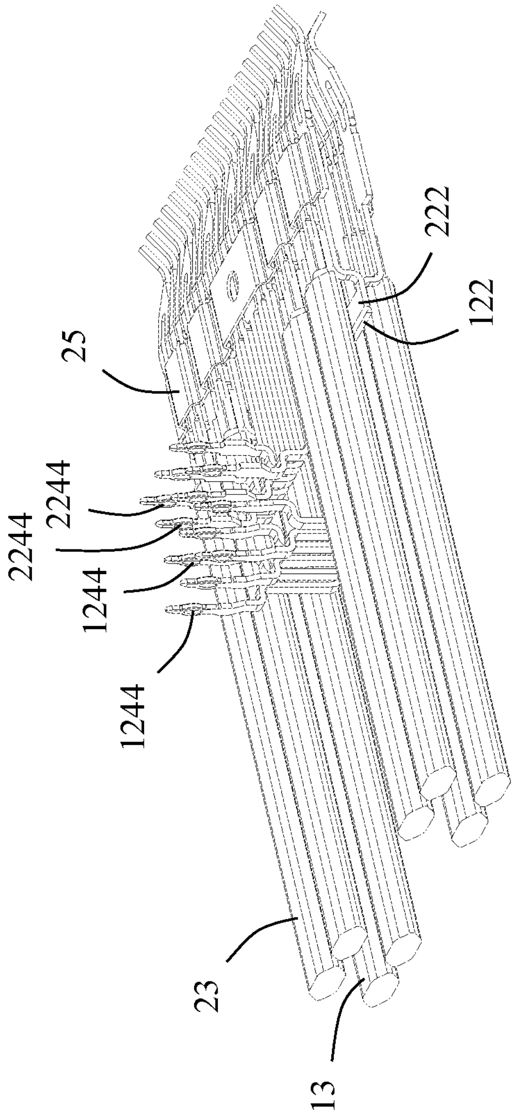
FIG. 15 is a perspective schematic view of FIG. 14 from another angle.
Figure 16:
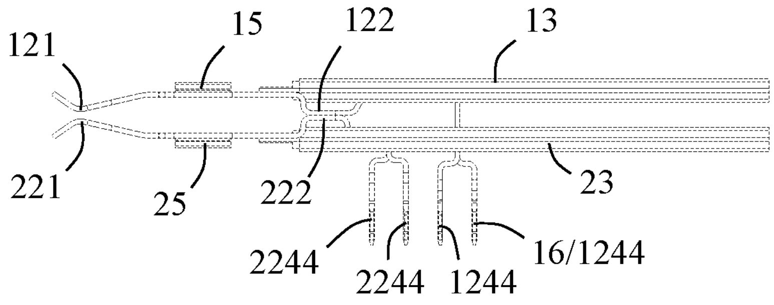
FIG. 16 is a right side view of FIG. 14.
Figure 17:
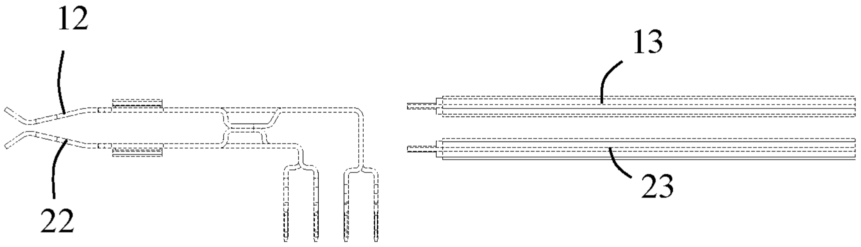
FIG. 17 is a partial exploded view of FIG. 16.
Figure 18:
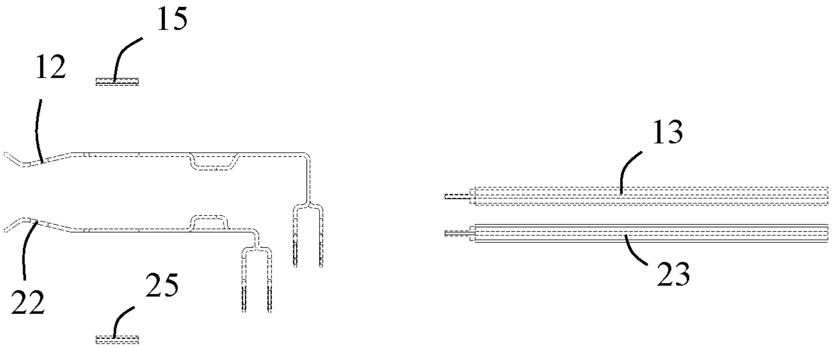
FIG. 18 is a further exploded view of FIG. 17.
Figure 19:
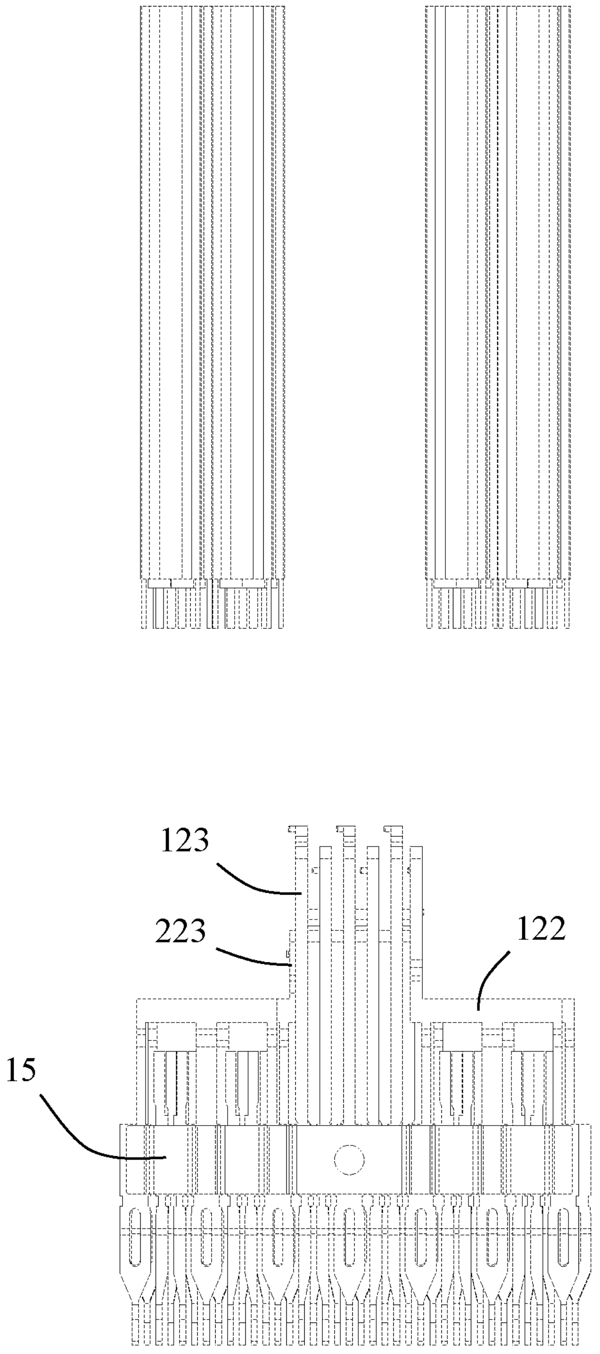
FIG. 19 is a top view of FIG. 17.
Figure 20:
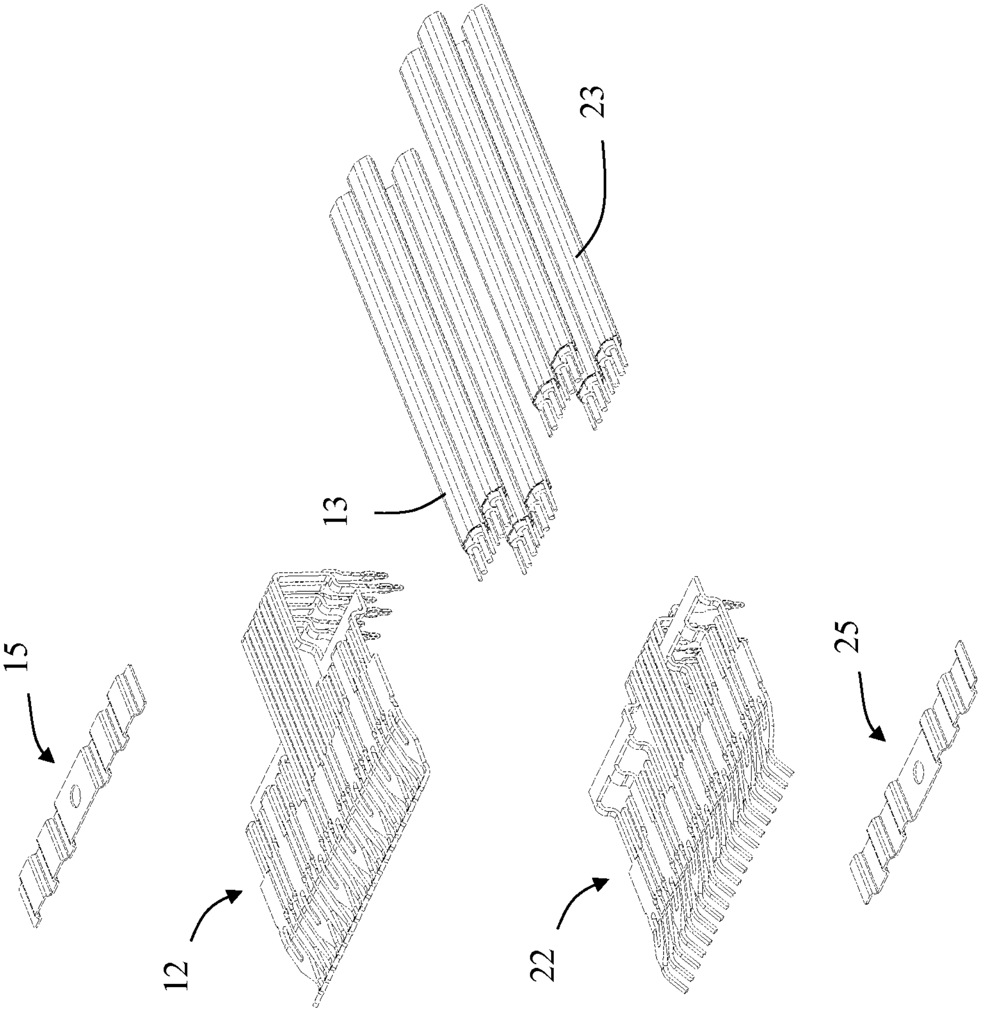
FIG. 20 is a perspective exploded view of FIG. 14.
Figure 21:
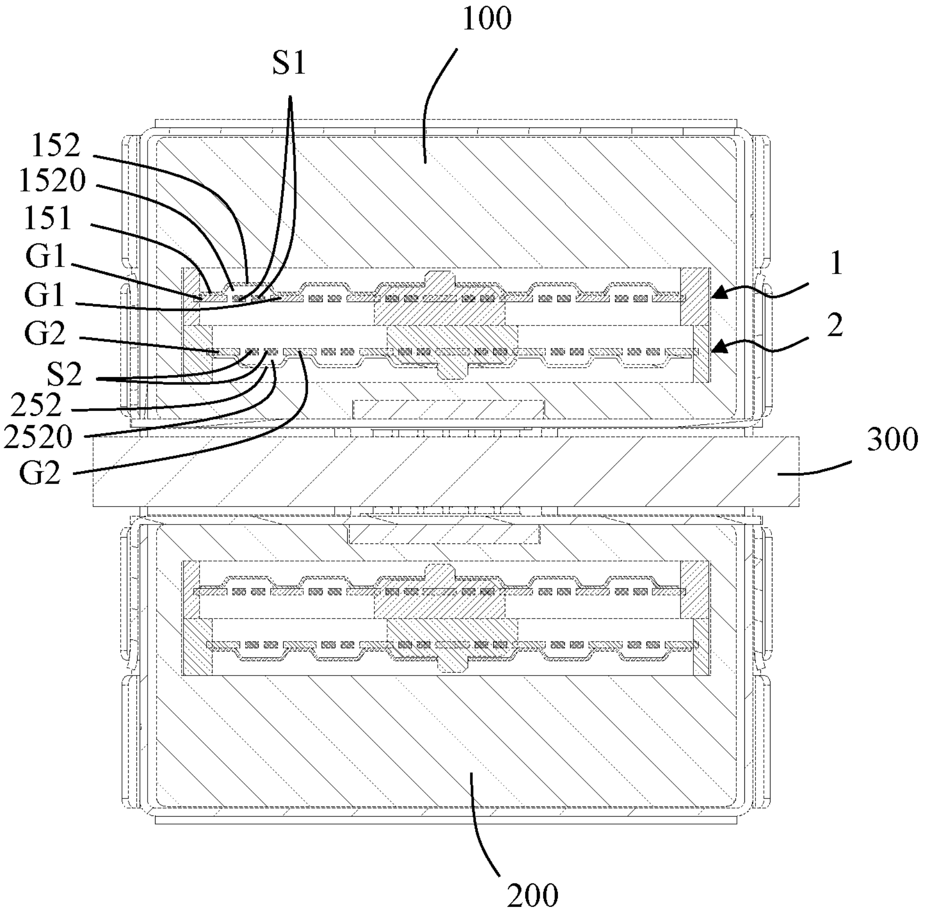
FIG. 21 is a schematic cross-sectional view taken along line A-A in FIG. 1.
Figure 22:
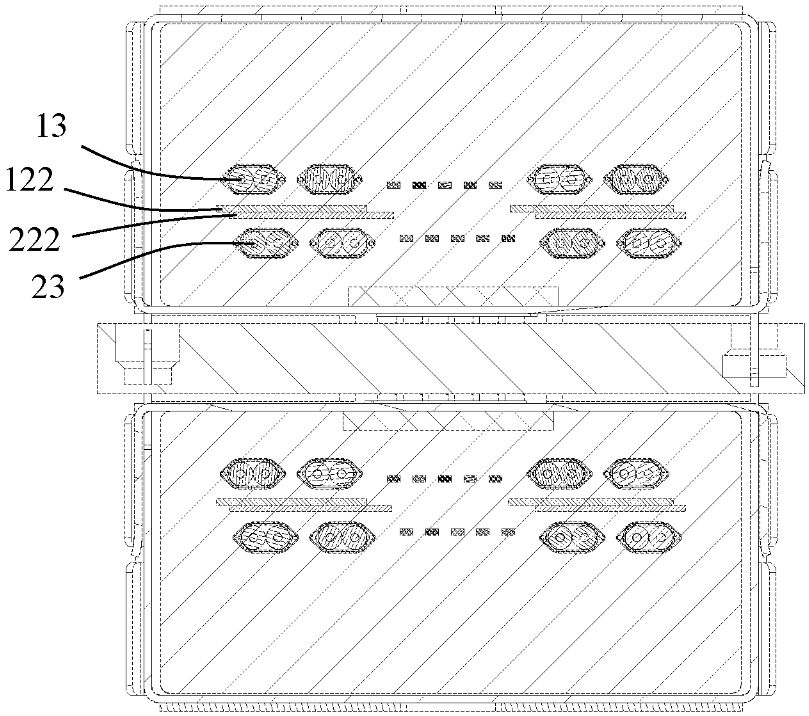
FIG. 22 is a schematic cross-sectional view taken along line B-B in FIG. 1.

Specifically, each first conductive terminal 12 includes a first mating portion 121 extending into the mating slot 320. The first mating portions 121 of the first conductive terminals 12 are arranged in a first row (for example, an upper row). The first conductive terminal module 1 includes a first tail portion 122 integrally connected with the plurality of first ground terminals G1. In the illustrated embodiment of the present disclosure, the first tail portion 122 is bent and extends toward the first mating surface 112. Referring to FIG. 13, in the illustrated embodiment of the present disclosure, the plurality of first ground terminals G1 are two groups. Correspondingly, there are two first tail portions 122. Each first tail portion 122 extends along a width direction W-W of the insulating body 3. The plurality of first ground terminals G1 of each group are integrally connected to the corresponding first tail portion 122 at intervals.

The first ground piece 15 is mounted in the first slot 111. The first ground piece 15 is in contact with the plurality of first ground terminals G1 so as to connect the plurality of first ground terminals G1 in series, thereby increasing the grounding area and improving the grounding effect. The first ground piece 15 does not contact the first signal terminals S1 in order to avoid short circuits. Specifically, the first ground piece 15 includes a plurality of first mating portions 151 in contact with the corresponding first ground terminals G1 and a plurality of first protrusions 152 each of which is connected between two adjacent first matting portions 151. A cross-section of each first protrusion 152 is substantially U-shaped. The first protrusion 152 defines a first space 1520. The first signal terminal S1 is located in the corresponding first space 1520 to avoid contact with any part of the first ground piece 15.

Each of the first intermediate terminals M1 includes a first extension portion 123 extending beyond the insulating body 3 and a first bending portion 124 vertically bent from a rear end of the first extension portion 123. The first bending portion 124 includes a first body portion 1241, a first deflection portion 1242 bent from the first body portion 1241, and a first end 1243 extending from the first deflection portion 1242. The first end 1243 is parallel to the first main body 1241. The first deflection portion 1242 is perpendicular to the first end 1243 and the first body portion 1241. The first end 1243 includes a first mounting foot 1244 for mounting the first intermediate terminal M1 to the circuit board 300. The first mounting foot 1244 includes a through hole 1245, so that the first mounting foot 1244 has a deformability to be better engaged with the corresponding conductive hole 304 of the circuit board 300.

In order to facilitate the arrangement, deflection directions of the first deflection portions 1242 of any two adjacent first intermediate terminals M1 are opposite, so that the first mounting feet 1244 of any two adjacent first intermediate terminals M1 are alternately arranged in two rows.

Similarly, the second conductive terminal module 2 includes a second insulating block 21, a plurality of second conductive terminals 22 fixed to the second insulating block 21, a plurality of second cables 23, a second fixing block 24 for fixing at least parts of the second conductive terminals 22, and a second ground piece 25.

The second insulating block 21 includes a second slot 211 and a second mating surface 212. In an embodiment of the present disclosure, the plurality of second conductive terminals 22 are insert-molded in the second insulating block 21. Parts of the plurality of second conductive terminals 22 are exposed in the second slot 211. Referring to FIGS. 12 to 23, the plurality of second conductive terminals 22 include a plurality of second signal terminals S2, a plurality of second ground terminals G2, and a plurality of second intermediate terminals M2. In an embodiment of the present disclosure, the plurality of second signal terminals S2 include a plurality of second signal terminal groups. Each second signal terminal group includes two of the second signal terminals S2. Each second signal terminal group is located between the two second ground terminals G2. The second signal terminals S2 and the second cables 23 are fixed by soldering or welding. In some embodiments, the plurality of first signal terminals S1 and the plurality of second signal terminals S2 are adapted to transmit relatively high-speed signals. The plurality of first intermediate terminals M1 and the plurality of second intermediate terminals M2 are adapted to transmit relatively non-high-speed signals.

Each second conductive terminal 22 includes a second mating portion 221 extending into the mating slot 320. The second mating portions 221 of the second conductive terminals 22 are arranged in a second row (for example, a lower row). The first mating portions 121 located in the first row and the second mating portions 221 located in the second row are parallel to each other so as to jointly clamp a tongue plate (not shown) of a mating connector. In some embodiments, the first mating portions 121 and the second mating portions 221 have elasticity, which can better clamp the tongue plate of the mating connector and elastically abut against conductive pads of the tongue plate. The second conductive terminal module 2 includes a second tail portion 222 integrally connected with the plurality of second ground terminals G2. In the illustrated embodiment of the present disclosure, the second tail portion 222 is bent and extends toward the second mating surface 212. Referring to FIG. 13, in the illustrated embodiment of the present disclosure, the plurality of second ground terminals G2 are two groups. Correspondingly, there are two second tail portions 222. Each second tail portion 222 extends along the width direction W-W of the insulating body 3. The plurality of second ground terminals G2 of each group are integrally connected to the corresponding second tail portion 222 at intervals.

The second ground piece 25 is mounted in the second slot 211, and the second ground piece 25 is in contact with the plurality of second ground terminals G2 to connect the plurality of second ground terminals G2 in series, thereby increasing the grounding area and improving the grounding effect. The second ground piece 25 does not contact the plurality of second signal terminals S2 in order to avoid short circuits. Specifically, the second ground piece 25 includes a plurality of second mating portions 251 in contact with the corresponding second ground terminals G2 and a plurality of second protrusions 252 each of which is connected between two adjacent second mating portions 251. A cross-section of the second protrusion 252 is substantially U-shaped. The second protrusion 252 defines a second space 2520. The second signal terminal S2 is located in the corresponding second space 2520 to avoid contact with any part of the second ground piece 25.

Each of the second intermediate terminals M2 includes a second extension portion 223 extending beyond the insulating body 3 and a second bending portion 224 vertically bent from a rear end of the second extension portion 223. The second bending portion 224 includes a second body portion 2241, a second deflection portion 2242 bent from the second body portion 2241, and a second end 2243 extending from the second deflection portion 2242. The second end 2243 is parallel to the second body portion 2241. The second deflection portion 2242 is perpendicular to the second end 2243 and the second body portion 2241. The second end 2243 includes a second mounting foot 2244 for mounting the second middle terminal M2 to the circuit board 300. The second mounting foot 2244 includes a through hole 2245, so that the second mounting foot 2244 has a deformability to be better engaged with the corresponding conductive hole 304 of the circuit board 300.

In order to facilitate the arrangement, deflection directions of the second deflection portions 2242 of any two adjacent second intermediate terminals M2 are opposite, so that the second mounting feet 2244 of any two adjacent second intermediate terminals M2 are alternately arranged in two rows.

Figure 24:
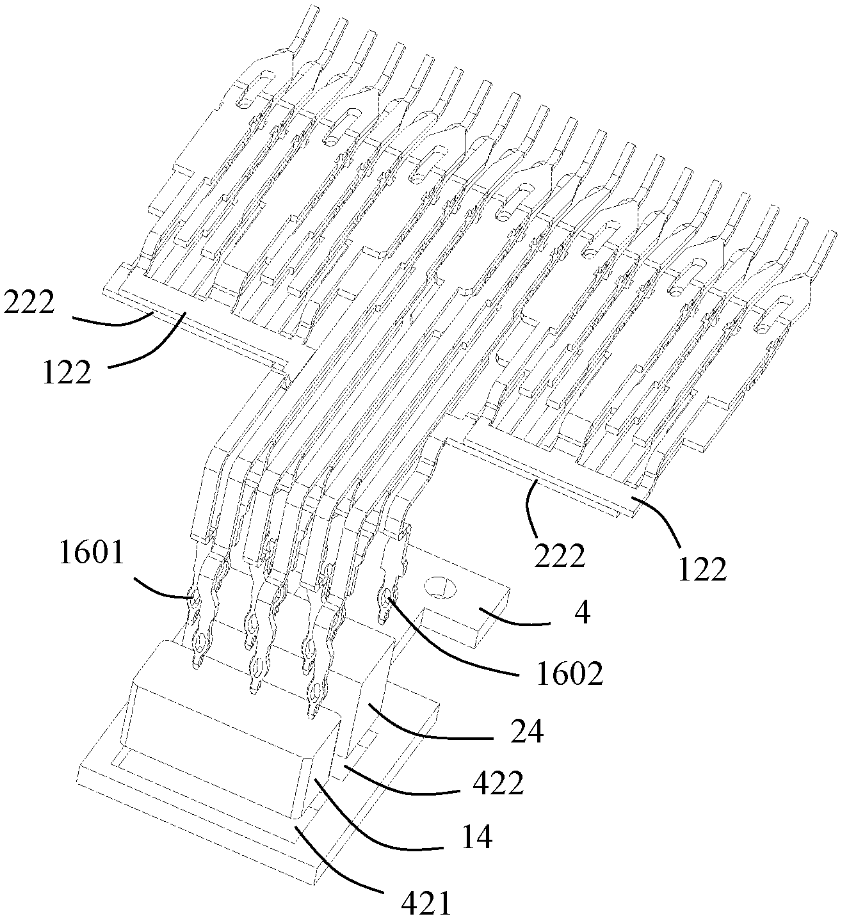
FIG. 24 is a perspective view of the first conductive terminals, the second conductive terminals, a first fixing block, a second fixing block and a fixing piece, wherein the first fixing block and the second fixing block are separated from the first conductive terminals and the second conductive terminals, respectively.

The first electrical connector 100 further includes a ground mounting portion 16 integrally extending from the first tail portion 122 and/or the second tail portion 222. The ground mounting portion 16 is adapted for being mounted to the circuit board 300. Referring to FIG. 24, in the illustrated embodiment of the present disclosure, the ground mounting portion 16 includes a first ground foot 1601 and a second ground foot 1602. The first ground foot 1601 is integrally connected to one of the first tail portions 122. The second ground foot 1602 is integrally connected to one of the second tail portions 222. One group of the plurality of first ground terminals G1 and one group of the plurality of second ground terminals G2 are jointly and are adapted to be electrically connected to the circuit board 300 via the first ground foot 1601. The plurality of first ground terminals G1 in the other group and the plurality of second ground terminals G2 in the other group are jointly and are adapted to be electrically connected to the circuit board 300 via the second ground foot 1602. The ground mounting portion 16 includes a through hole 161, so that the ground mounting portion 16 has a deformability to be better engaged with the corresponding conductive hole 304 of the circuit board 300.

In order to facilitate the arrangement, the first mounting feet 1244 and the first ground feet 1601 of any two adjacent first intermediate terminals M1 are alternately arranged in two rows. The second mounting feet 2244 and the second ground feet 1602 of any two adjacent second middle terminals M2 are alternately arranged in two rows. In the illustrated embodiment of the present disclosure, the plurality of first bending portions 124 and the first ground foot 1601 are fixed to the first fixing block 14, and the plurality of second bending portions 224 and the second ground foot 1602 are fixed to the second fixing block 24 in order to facilitate the improvement of the structural strength of the terminals and the maintenance of the distance between the terminals.

In the width direction W-W, the plurality of first intermediate terminals M1 are located between the two groups of the plurality of first ground terminals G1, and the plurality of second intermediate terminals M2 are located between the two groups of the plurality of second ground terminals G2. The two groups of the plurality of first ground terminals G1 are respectively integrally connected to the two first tail portions 122. The two groups of the plurality of second ground terminals G2 are respectively integrally connected to the two second tail portions 222. The two first tail portions 122 are in contact with the two second tail portions 222, respectively.

In the illustrated embodiment of the present disclosure, after the first conductive terminal module 1 and the second conductive terminal module 2 are assembled in the receiving space 310 of the insulating body 3, the first mating surface 112 of the first insulating block 11 and the second mating surface 212 of the second insulating block 21 are adjacent to each other. At this time, the first tail portion 122 of the first conductive terminal module 1 is in contact with the second tail portion 222 of the second conductive terminal module 2 so as to increase the grounding area and improve the grounding effect. With the help of the first ground piece 15 and the second ground piece 25, the first ground terminals G1 of the first conductive terminal module 1 and the second ground terminals G2 of the second conductive terminal module 2 are connected in series. In addition, the first ground terminals G1, the first ground piece 15, the second ground terminals G2, and the second ground piece 25 can all be grounded to the circuit board 300 through the ground mounting portion 16. Compared with the related art, the first ground terminals G1 and the second ground terminals G2 are not grounded through cables, which avoids using cables for ground return. On one hand, it simplifies the grounding method; on the other hand, it is beneficial to improve the stability of signal transmission.

In the illustrated embodiment of the present disclosure, the first mounting feet 1244 of the first intermediate terminals M1 are alternately arranged in two rows. The second mounting feet 2244 of the second middle terminals M2 are alternately arranged in two rows. The first mounting feet 1244 are located at a rear end of the second mounting feet 2244 along a mating direction of the mating connector. In other words, the first mounting feet 1244 of the first intermediate terminals M1 and the second mounting feet 2244 of the second intermediate terminals M2 are arranged in four rows. The first mounting feet 1244 are located at the rear end of the second mounting feet 2244 along the mating direction of the mating connector.

Figure 9:
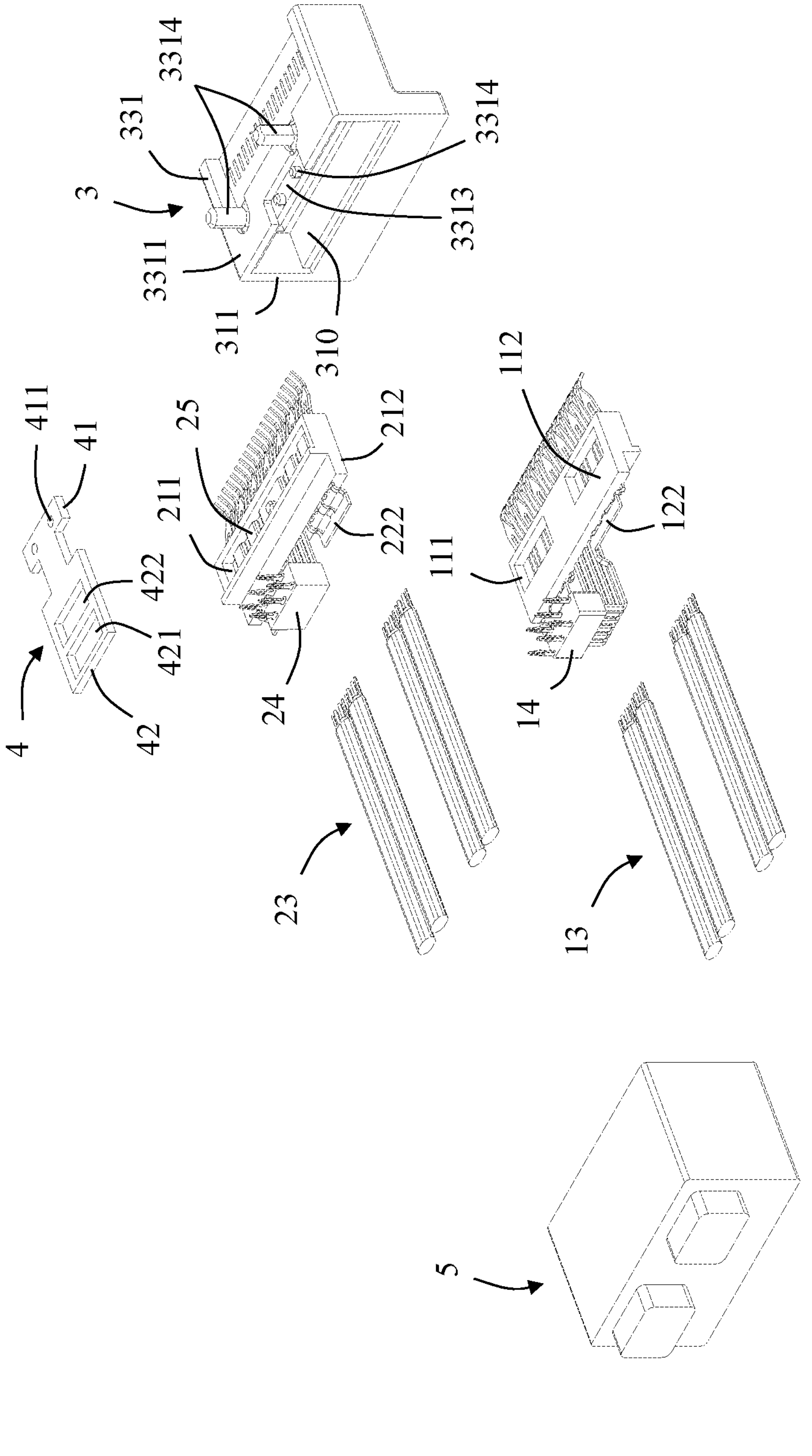
FIG. 9 is a partially exploded perspective view of FIG. 8 from another angle.
Figure 10:
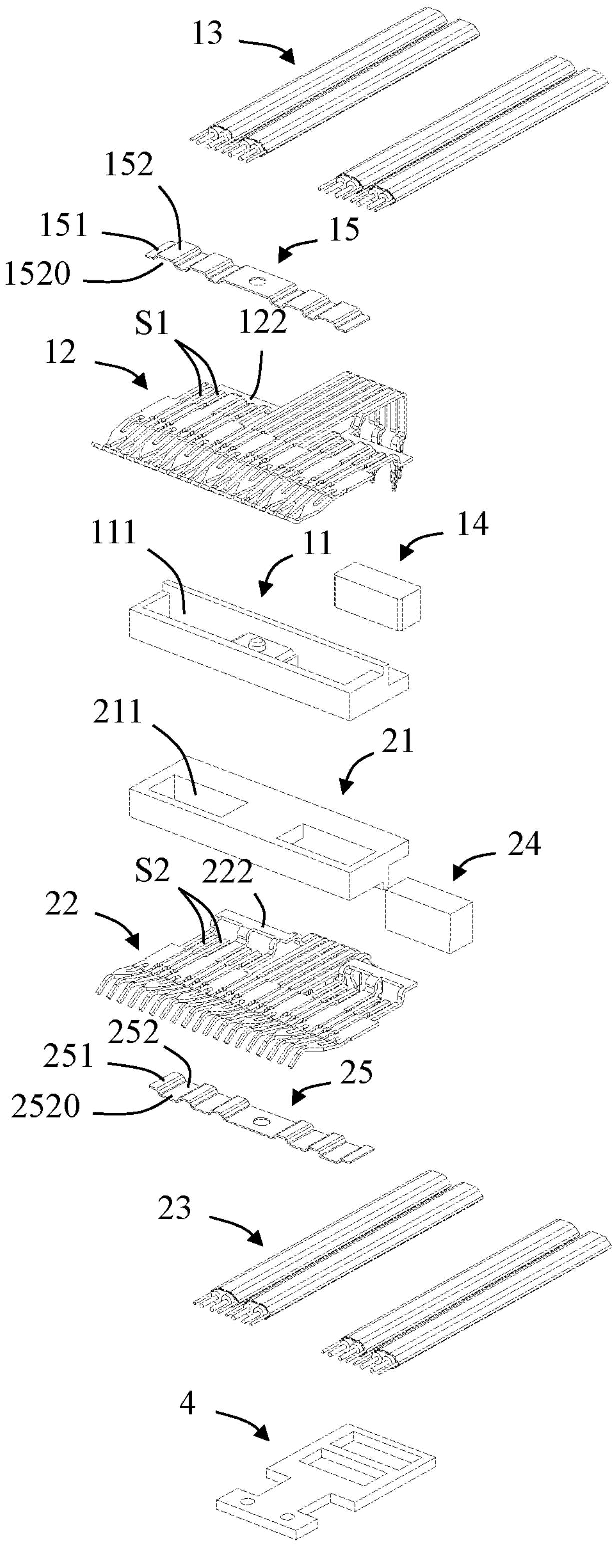
FIG. 10 is a further perspective exploded view after removing an insulating body and an over-molding housing in FIG. 8; FIG.
Figure 11:
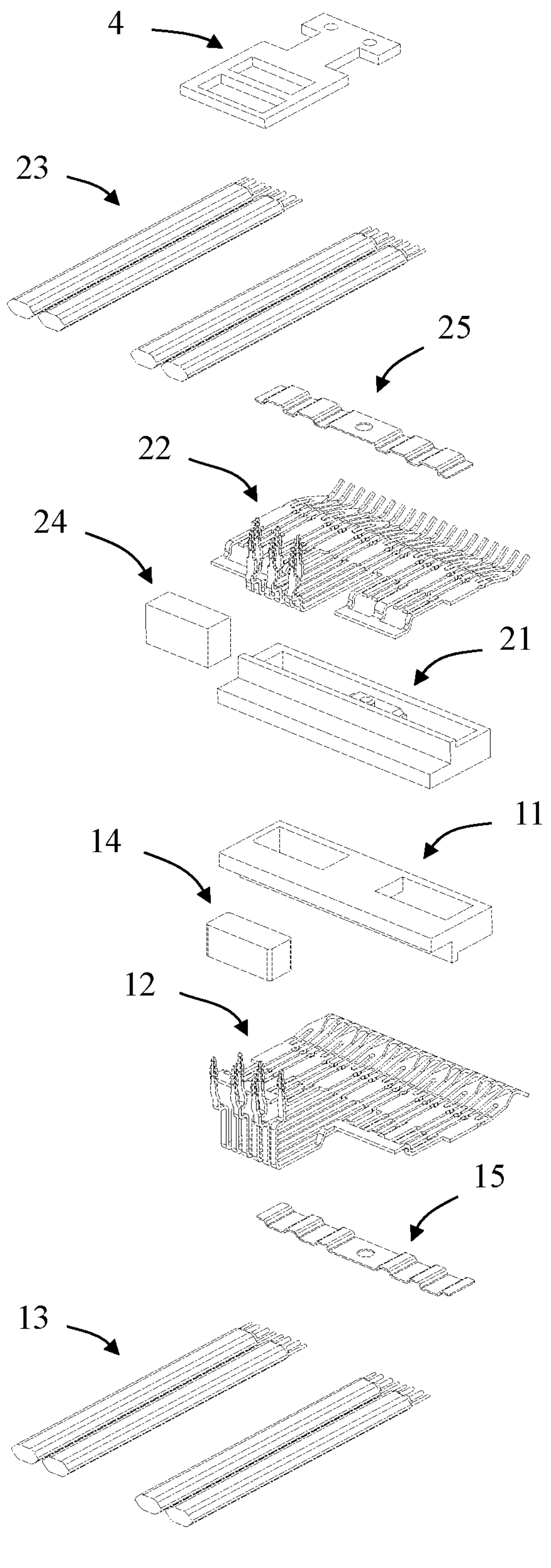
FIG. 11 is a perspective exploded view of FIG. 10 from another angle.
Figure 12:
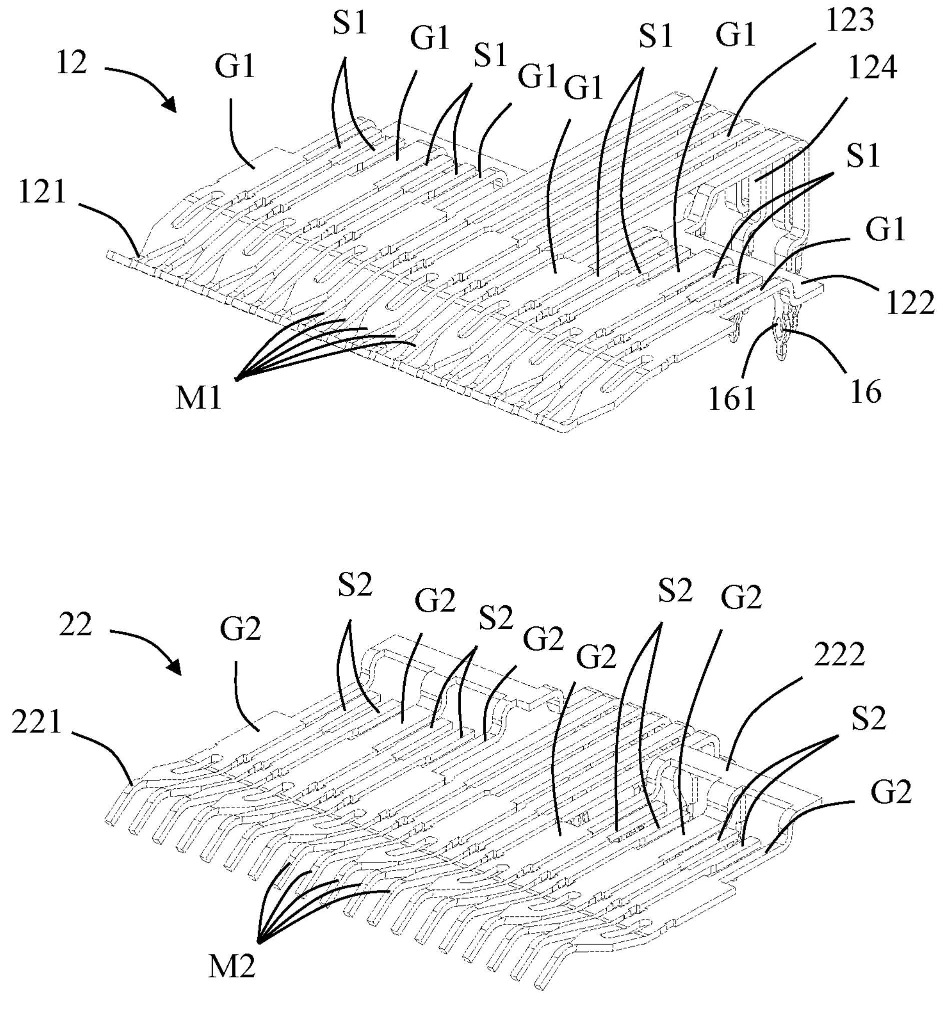
FIG. 12 is a perspective view of a plurality of first conductive terminals and a plurality of second conductive terminals.

Referring to FIG. 9, the fixing piece 4 includes a first positioning portion 41 received in the mounting groove 3313 and a second positioning portion 42 connected to the first positioning portion 41. The first positioning portion 41 includes a plurality of positioning holes 411 matched with the positioning protrusions 3314. The second positioning portion 42 includes a first positioning slot 421 sleeved on the first fixing block 14 and a second positioning slot 422 sleeved on the second fixing block 24. The first positioning slot 421 and the second positioning slot 422 are closely matched with the first fixing block 14 and the second fixing block 24, respectively, so as to limit the first fixing block 14 and the second fixing block 24. As a result, a distance between the first fixing block 14 and the second fixing block 24 is restricted, thereby maintaining a distance between the first conductive terminals 12 and the second conductive terminals 22.

Figure 5:
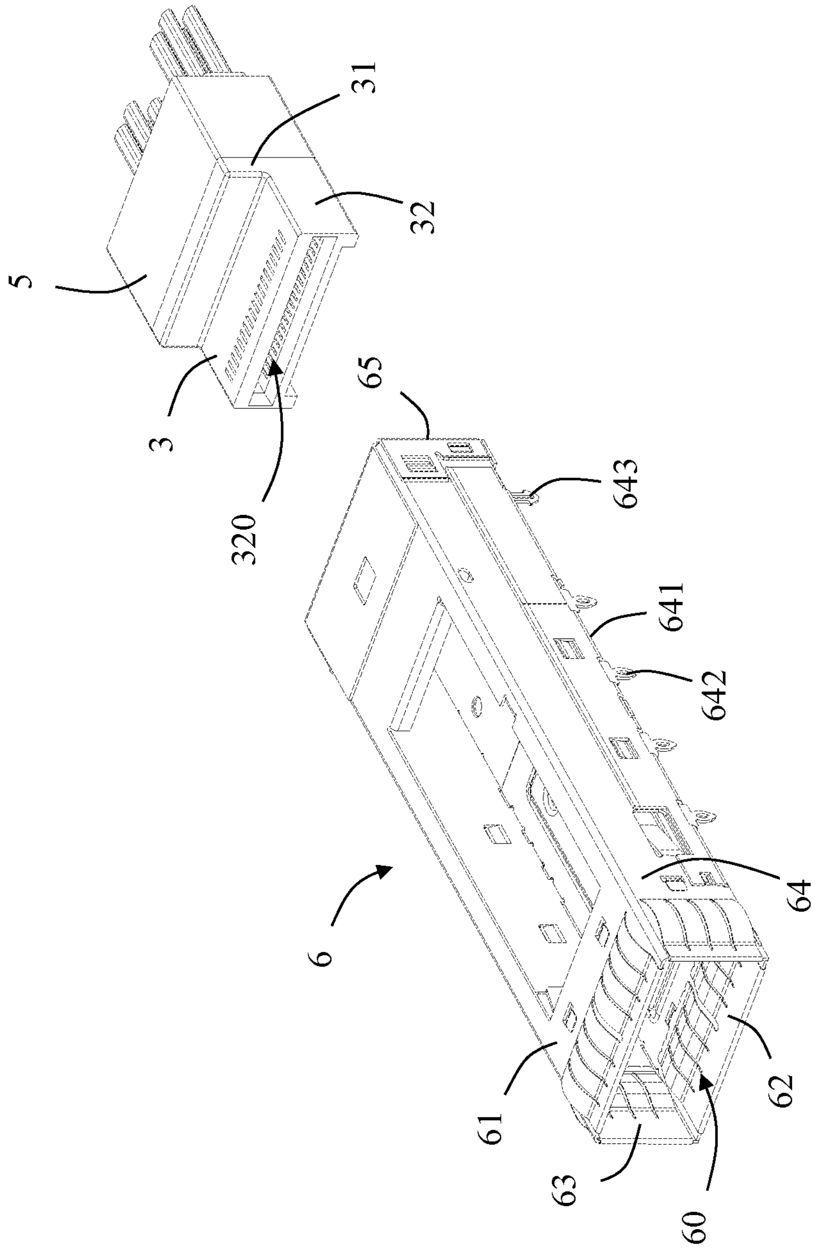
FIG. 5 is a partial perspective exploded view of an electrical connector in FIG. 3.
Figure 6:
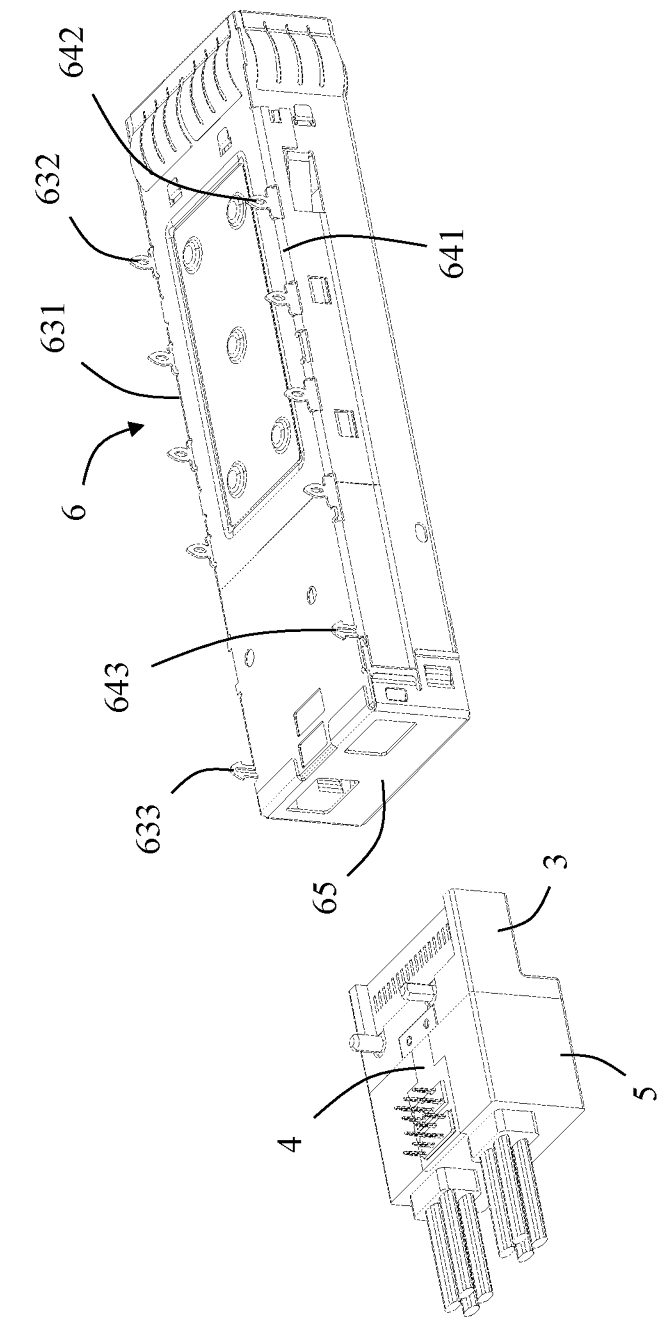
FIG. 6 is a partially exploded perspective view of FIG. 5 from another angle.
Figure 7:
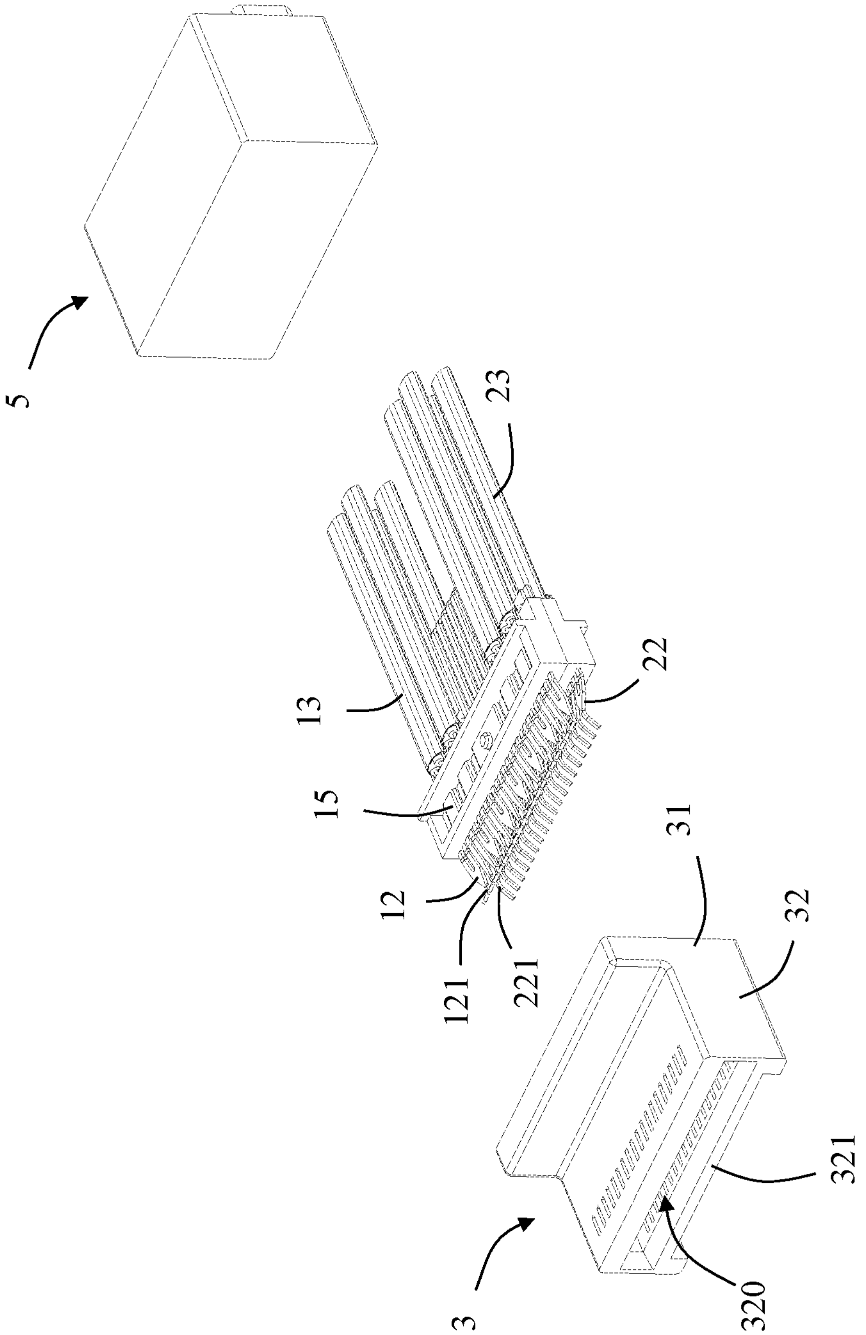
FIG. 7 is a further perspective exploded view after removing a metal cage in FIG. 5.
Figure 8:
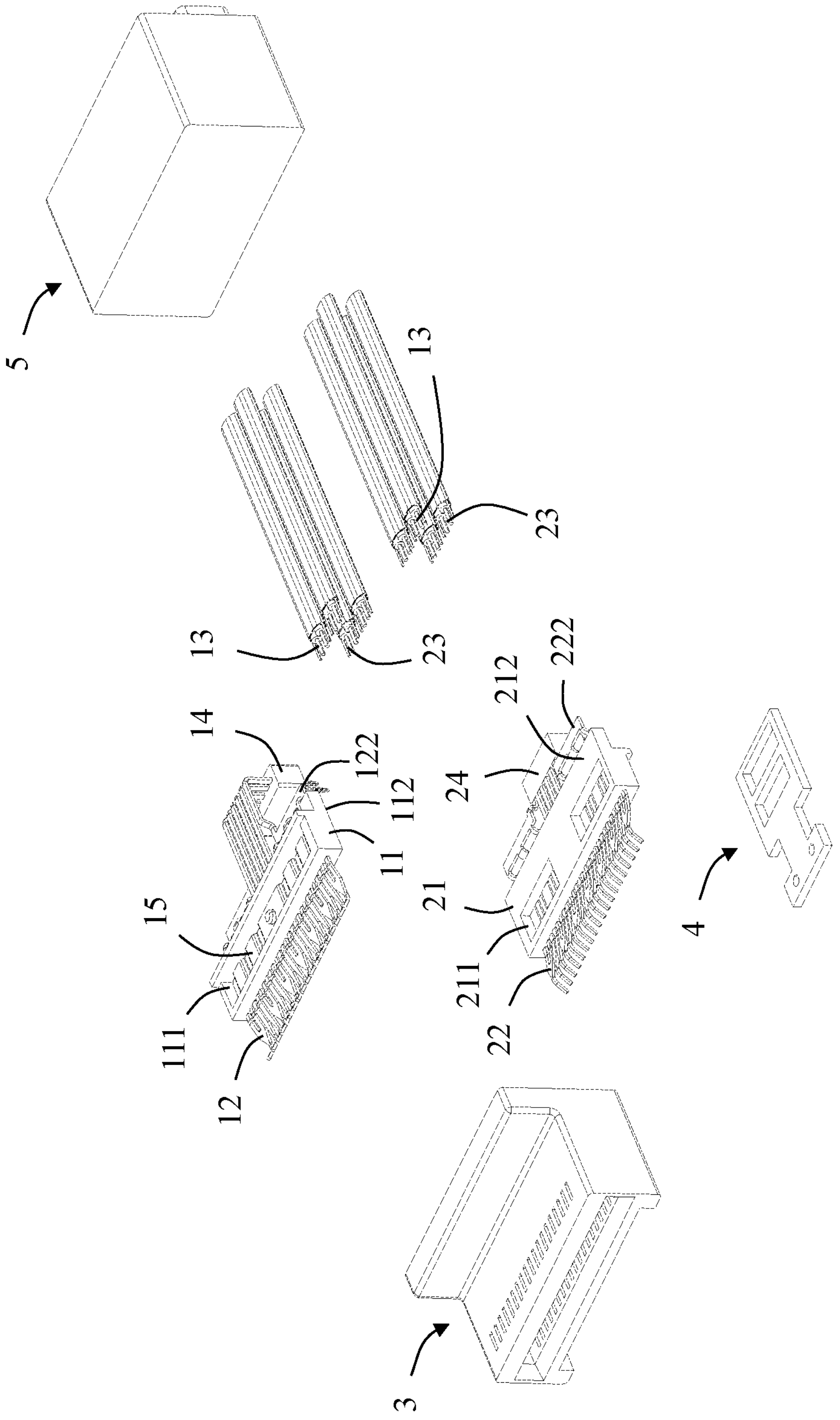
FIG. 8 is a further perspective exploded view of FIG. 7.
Figure 23:
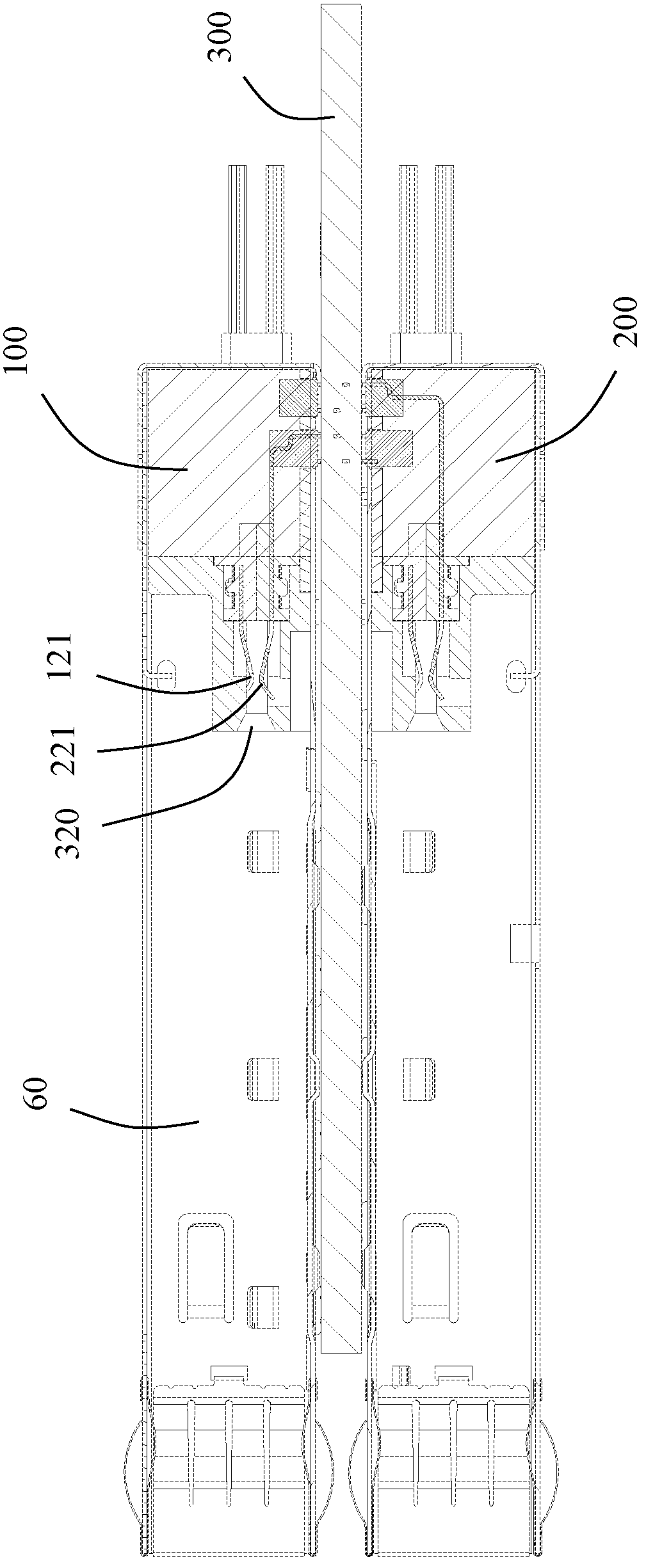
FIG. 23 is a schematic cross-sectional view taken along the line C-C in FIG. 1.

Referring to FIGS. 5 and 6, the metal cage 6 includes a top wall 61, a bottom wall 62, a first side wall 63 connected to one side of the top wall 61 and one side of the bottom wall 62, a second side wall 64 connected to the other side of the top wall 61 and the other side of the bottom wall 62, and a rear wall 65 at a rear end. The metal cage 6 is roughly cylindrical, so as to have a better shielding effect. The top wall 61, the bottom wall 62, the first side wall 63 and the second side wall 64 are jointly enclosed to form a receiving cavity 60 for receiving most part of the mating connector. Referring to FIG. 23, the receiving cavity 60 is in communication with the mating slot 320. The receiving cavity 60 is located at a front end of the mating slot 320. The receiving cavity 60 and the mating slot 320 are adapted for jointly receiving the mating connector.

Referring to FIGS. 3 to 6, the first side wall 63 of the metal cage 6 is provided with a first side edge 631, a plurality of first locking feet 632 protruding from the first side edge 631, and a plurality of first buckling feet 633 protruding from the first side edge 631. The first locking feet 632 and the first bucking feet 633 are adapted for being inserted into the corresponding locking holes 303 of the circuit board 300 and being fixed to the circuit board 300.

The second side wall 64 of the metal cage 6 is provided with a second side edge 641, a plurality of second locking feet 642 protruding from the second side edge 641, and a plurality of second buckling feet 643 protruding from the second side edge 641. Each of the second locking feet 642 and the second buckling feet 643 includes a hook which is inserted into the corresponding locking hole 303 of the circuit board 300 and fixed to the circuit board 300.

By providing the first buckling feet 633 and the second buckling feet 643, the holding force of the metal cage 6 and the circuit board 300 can be improved, thereby reducing the risk of an external force applied to the cables pulling the metal cage 6 and separating the metal cage 6 from the circuit board 300.

The above embodiments are only used to illustrate the present disclosure and not to limit the technical solutions described in the present disclosure. The understanding of this specification should be based on those skilled in the art. Descriptions of directions, such as “front”, “back”, “left”, “right”, “top” and “bottom”, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector adapted to be at least partially mounted to a circuit board, the electrical connector comprising:

an insulating body, the insulating body defining a mating slot;

a plurality of first conductive terminals, the plurality of first conductive terminals comprising a plurality of first signal terminals and a plurality of first ground terminals, each of the first conductive terminals comprising a first mating portion extending into the mating slot, the first mating portions of the plurality of first conductive terminals being arranged in a first row;

a plurality of second conductive terminals, the plurality of second conductive terminals comprising a plurality of second signal terminals and a plurality of second ground terminals, each of the second conductive terminals comprising a second mating portion extending into the mating slot, the second mating portions of the plurality of second conductive terminals being arranged in a second row; and a plurality of cables, the plurality of cables comprising a plurality of first cables electrically connected with the plurality of first signal terminals and a plurality of second cables electrically connected with the plurality of second signal terminals;

wherein the plurality of first ground terminals and the plurality of second ground terminals are connected to each other and are adapted to be electrically connected to the circuit board;

the electrical connector further comprises a first tail portion integrally connected with the plurality of first ground terminals and a second tail portion integrally connected with the plurality of second ground terminals; wherein the first tail portion is in contact with the second tail portion;

the plurality of first signal terminals are divided into a plurality of first signal terminal groups, each of the first signal terminal groups comprises two of the first signal terminals, each first signal terminal group is located between two first ground terminals, the first signal terminals and the first cables are fixed by soldering or welding;

wherein the plurality of second signal terminals are divided into a plurality of second signal terminal groups, each of the second signal terminal groups comprises two of the second signal terminals, each second signal terminal group is located between two second ground terminals, the second signal terminals and the second cables are fixed by soldering or welding;

wherein each of the first tail portion and the second tail portion extends along a width direction of the insulating body, the plurality of first ground terminals are integrally connected to the first tail portion at intervals, and the plurality of second ground terminals are integrally connected to the second tail portion at intervals;

the plurality of first conductive terminals further comprise a plurality of first intermediate terminals, each of the first intermediate terminals comprises a first mounting foot for being mounted to the circuit board;

wherein the plurality of second conductive terminals further comprise a plurality of second intermediate terminals, each of the second intermediate terminals comprises a second mounting foot for being mounted to the circuit board; and wherein in the width direction, the plurality of first intermediate terminals are located between two groups of the plurality of first ground terminals, and the plurality of second intermediate terminals are located between two groups of the plurality of second ground terminals; the two groups of the plurality of first ground terminals are respectively integrally connected to two first tail portions, the two groups of the plurality of second ground terminals are respectively integrally connected to two second tail portions, and the two first tail portions are in contact with the two second tail portions, respectively.

2. The electrical connector according to claim 1, further comprising a ground mounting portion integrally extending from the first tail portion and/or the second tail portion; wherein the ground mounting portion is adapted for being mounted to the circuit board.

3. The electrical connector according to claim 2, wherein the ground mounting portion comprises a through hole so that the ground mounting portion has a capability of being deformed so as to be engaged with a conductive hole of the circuit board.

4. The electrical connector according to claim 2, wherein the ground mounting portion comprises a first ground foot and a second ground foot, the first ground foot is integrally connected to one of the first tail portions, and the second ground foot is integrally connected to one of the second tail portions;

wherein one group of the plurality of first ground terminals and one group of the plurality of second ground terminals are adapted to be electrically connected to the circuit board via the first ground foot, and an another group of the plurality of first ground terminals and an another group of the plurality of second ground terminals are adapted to be electrically connected to the circuit board via the second ground foot.

5. The electrical connector according to claim 4, wherein each of the first intermediate terminals comprises a first extension portion extending beyond the insulating body and a first bending portion bent from the first extension portion; the first bending portion comprises a first body portion, a first deflection portion bent from the first body portion, and a first end extending from the first deflection portion; the first end is parallel to the first body portion, and the first mounting foot is provided at the first end;

wherein each of the second intermediate terminals comprises a second extension portion extending beyond the insulating body, and a second bending portion bent from the second extension portion; the second bending portion comprises a second body portion, a second deflection portion bent from the second body portion, and a second end extending from the second deflection portion; the second end is parallel to the second body portion, and the second mounting foot is provided at the second end; and wherein deflection directions of the first deflection portions of any two adjacent first intermediate terminals are opposite, the first mounting foot and the first ground foot of any two adjacent first intermediate terminals are alternately arranged in two rows, deflection directions of the second deflection portions of any two adjacent second intermediate terminals are opposite, and the second mounting foot and the second ground foot of any two adjacent second intermediate terminals are alternately arranged in two rows.

6. The electrical connector according to claim 5, further comprising a first fixing block fixed to the plurality of first bending portions and the first ground foot, and a second fixing block fixed to the plurality of second bending portions and the second ground foot.

7. The electrical connector according to claim 1, further comprising a first ground piece in contact with the plurality of first ground terminals so as to connect the plurality of first ground terminals in series, and a second ground piece in contact with the plurality of second ground terminals so as to connect the plurality of second ground terminals in series.

8. An electrical connector assembly, comprising:

a first electrical connector;

a second electrical connector; and a circuit board, the circuit board comprising a first side and a second side opposite to the first side;

wherein the first electrical connector is mounted to the first side of the circuit board, and the second electrical connector is mounted to the second side of the circuit board;

wherein the first electrical connector comprises:

an insulating body, the insulating body defining a mating slot;

a plurality of first conductive terminals, the plurality of first conductive terminals comprising a plurality of first signal terminals and a plurality of first ground terminals, each of the first conductive terminals comprising a first mating portion extending into the mating slot, the first mating portions of the plurality of first conductive terminals being arranged in a first row;

a plurality of second conductive terminals, the plurality of second conductive terminals comprising a plurality of second signal terminals and a plurality of second ground terminals, each of the second conductive terminals comprising a second mating portion extending into the mating slot, the second mating portions of the plurality of second conductive terminals being arranged in a second row; and a plurality of cables, the plurality of cables comprising a plurality of first cables electrically connected with the plurality of first signal terminals and a plurality of second cables electrically connected with the plurality of second signal terminals;

wherein the plurality of first ground terminals and the plurality of second ground terminals are connected to each other and are electrically connected to the circuit board;

wherein the first electrical connector further comprises a first tail portion integrally connected with the plurality of first ground terminals and a second tail portion integrally connected with the plurality of second ground terminals; wherein the first tail portion is in contact with the second tail portion;

wherein the plurality of first signal terminals are divided into a plurality of first signal terminal groups, each of the first signal terminal groups comprises two of the first signal terminals, each first signal terminal group is located between two first ground terminals, the first signal terminals and the first cables are fixed by soldering or welding;

wherein the plurality of second signal terminals are divided into a plurality of second signal terminal groups, each of the second signal terminal groups comprises two of the second signal terminals, each second signal terminal group is located between two second ground terminals, the second signal terminals and the second cables are fixed by soldering or welding;

wherein each of the first tail portion and the second tail portion extends along a width direction of the insulating body, the plurality of first ground terminals are integrally connected to the first tail portion at intervals, and the plurality of second ground terminals are integrally connected to the second tail portion at intervals;

the plurality of first conductive terminals further comprise a plurality of first intermediate terminals, each of the first intermediate terminals comprises a first mounting foot mounted to the circuit board;

wherein the plurality of second conductive terminals further comprise a plurality of second intermediate terminals, each of the second intermediate terminals comprises a second mounting foot mounted to the circuit board; and wherein in the width direction, the plurality of first intermediate terminals are located between two groups of the plurality of first ground terminals, and the plurality of second intermediate terminals are located between two groups of the plurality of second ground terminals; the two groups of the plurality of first ground terminals are respectively integrally connected to two first tail portions, the two groups of the plurality of second ground terminals are respectively integrally connected to two second tail portions, and the two first tail portions are in contact with the two second tail portions, respectively.

9. The electrical connector assembly according to claim 8, wherein the first electrical connector further comprises a ground mounting portion integrally extending from the first tail portion and/or the second tail portion; wherein the ground mounting portion is mounted to the circuit board.

10. The electrical connector assembly according to claim 9, wherein the ground mounting portion comprises a through hole so that the ground mounting portion has a capability of being deformed so as to be engaged with a conductive hole of the circuit board.

11. The electrical connector assembly according to claim 9, wherein the ground mounting portion comprises a first ground foot and a second ground foot, the first ground foot is integrally connected to one of the first tail portions, and the second ground foot is integrally connected to one of the second tail portions;

wherein one group of the plurality of first ground terminals and one group of the plurality of second ground terminals are electrically connected to the circuit board via the first ground foot, and an another group of the plurality of first ground terminals and an another group of the plurality of second ground terminals are electrically connected to the circuit board via the second ground foot.

12. The electrical connector assembly according to claim 11, wherein each of the first intermediate terminals comprises a first extension portion extending beyond the insulating body and a first bending portion bent from the first extension portion; the first bending portion comprises a first body portion, a first deflection portion bent from the first body portion, and a first end extending from the first deflection portion; the first end is parallel to the first body portion, and the first mounting foot is provided at the first end;

wherein each of the second intermediate terminals comprises a second extension portion extending beyond the insulating body, and a second bending portion bent from the second extension portion; the second bending portion comprises a second body portion, a second deflection portion bent from the second body portion, and a second end extending from the second deflection portion; the second end is parallel to the second body portion, and the second mounting foot is provided at the second end; and wherein deflection directions of the first deflection portions of any two adjacent first intermediate terminals are opposite, the first mounting foot and the first ground foot of any two adjacent first intermediate terminals are alternately arranged in two rows, deflection directions of the second deflection portions of any two adjacent second intermediate terminals are opposite, and the second mounting foot and the second ground foot of any two adjacent second intermediate terminals are alternately arranged in two rows.

13. The electrical connector assembly according to claim 12, wherein the first electrical connector further comprises a first fixing block fixed to the plurality of first bending portions and the first ground foot, and a second fixing block fixed to the plurality of second bending portions and the second ground foot.

14. The electrical connector assembly according to claim 8, wherein the first electrical connector further comprises a first ground piece in contact with the plurality of first ground terminals so as to connect the plurality of first ground terminals in series, and a second ground piece in contact with the plurality of second ground terminals so as to connect the plurality of second ground terminals in series.

* * * * *